United States Patent [19]
Grimes, III et al.

[11] Patent Number: 5,266,249
[45] Date of Patent: Nov. 30, 1993

[54] METHOD OF FORMING A FIBER REINFORCED PLASTIC STRUCTURE

[75] Inventors: Paul J. Grimes, III; Timothy M. Duffy, both of Jamestown, R.I.

[73] Assignee: Fusion Composites, Inc., Middletown, R.I.

[21] Appl. No.: 815,504

[22] Filed: Jan. 2, 1992

[51] Int. Cl.⁵ .................. B29C 67/22; B29C 51/28
[52] U.S. Cl. .................. 264/45.2; 264/257; 264/258; 264/261; 264/263; 264/314
[58] Field of Search .............. 264/45.6, 101, 102, 264/45.2, 511, 510, 257, 258, 314, 316, 263, 261

[56] References Cited

U.S. PATENT DOCUMENTS

| | | | |
|---|---|---|---|
| 2,353,996 | 7/1944 | Cooke et al. | 264/314 |
| 2,923,978 | 2/1960 | Corzine | 264/314 |
| 3,832,109 | 8/1974 | Ranallo et al. | 264/314 |
| 3,892,831 | 7/1975 | Robin et al. | 264/314 |
| 3,937,781 | 2/1976 | Allen | 264/314 |
| 3,985,330 | 10/1976 | Dorfman | 264/314 |
| 4,551,290 | 11/1985 | Mizell | 264/46.6 |
| 4,560,523 | 12/1985 | Plumley et al. | 264/314 |
| 4,681,651 | 7/1987 | Brozovic et al. | 156/245 |
| 4,683,099 | 7/1987 | Buxton et al. | 264/511 |
| 4,798,549 | 1/1989 | Hirsch | 441/74 |
| 4,808,362 | 2/1989 | Freeman | 264/314 |
| 4,964,825 | 10/1990 | Paccoret et al. | 441/74 |
| 4,983,430 | 1/1991 | Sargent | 428/34 |
| 5,000,902 | 3/1991 | Adams | 264/510 |
| 5,023,042 | 6/1991 | Efferding | 264/511 |
| 5,080,385 | 1/1992 | Duplessis | 264/258 |
| 5,106,568 | 4/1992 | Honka | 264/258 |

Primary Examiner—Allan R. Kuhns
Attorney, Agent, or Firm—Salter, Michaelson & Benson

[57] ABSTRACT

A method of forming a hollow structure in a female mold includes the step of assembling a vacuum bag and an uncured composite layer assembly comprising a fiber reinforced resin in a female mold, so that the composite layer assembly extends along the inner surfaces of the mold, and so that the vacuum bag is received inside the composite layer assembly in the mold. The method further includes the step of evacuating the area between the vacuum bag and the composite layer assembly, so that the vacuum bag applies outward pressure to the composite layer assembly in order to urge the composite layer assembly outwardly against the inner surface of the mold. The method still further includes the steps of curing the composite layer assembly while maintaining a vacuum on the area between the composite layer assembly and the vacuum bag, and thereafter releasing the vacuum and removing the cured composite layer assembly from the mold.

21 Claims, 4 Drawing Sheets

METHOD OF FORMING A FIBER REINFORCED PLASTIC STRUCTURE

BACKGROUND AND SUMMARY OF THE INVENTION

The instant invention relates to the construction of fiber reinforced plastic structures, and more particularly to a method of forming a hollow structure, such as a hull of a sailboard, from a fiber reinforced plastic material in a female mold.

Fiber reinforced plastic structures are generally formed by applying uncured fiber reinforced plastic materials to either the exterior surfaces of male molds, which are formed in the configurations of desired structures, or to the interior surfaces of female molds which are formed in configurations that are complimentary to those of desired structures. In this regard, it has been found that male molds are generally easier to construct than female molds, because they are formed in the configurations of desired structures rather than in complimentary configurations. Still further, it has been found that it is possible to form seamless fiber reinforced plastic shells over some male molds. Filament-wound fuel tanks formed over mandrels, and sailboard hulls formed over shaped foam blanks are examples of structures made by this technique. Unfortunately, however, since the outer surfaces of structures formed around male molds are not formed against finished mold surfaces they generally require substantial amounts of finish work. Further, when seamless hollow structures are formed around mandrels, the mandrels are generally not removable from within the structures thereof without being destroyed.

Because structures which are formed on male molds generally require substantial amounts of outer surface finish work, it has been found that it is generally preferable to form composite structure from fiber reinforced plastic material in female molds whenever several structures are to be built from one mold, and the structures must have finished outer surfaces. In this regard, since the outer surfaces of components formed in female molds are generally formed against smooth mold surfaces they generally require relatively little finish work after they have been removed from the molds thereof. Further, it has been found that female molds can generally be re-used, even when they are used to form hollow structures. However, because of the inaccessibility of the interiors of female molds which define substantially enclosed interior areas, heretofore it has frequently not been practical to form seamless hollow structures in female molds. Consequently, heretofore it has generally been necessary to form hollow structures by forming two or more structure sections in separate female molds and then gluing or otherwise bonding the sections together. The disadvantage of such a construction technique is that in cases where the interiors of hollow structures are inaccessible after the sections thereof have been glued or otherwise bonded together it is impossible to apply fiber reinforcement to the inner sides of the seam areas where the two or more sections are glued or bonded together. Further, if the exterior of the finished structure is reinforced in the seam areas substantial amounts of finish work are generally required to finish these outer surface areas.

While heretofore it has been known to form seamless hollow structures utilizing multi-piece female molds which define substantially enclosed interior areas, the heretofore known techniques have generally been limited to applications requiring low pressure during curing. Specifically, the heretofore known techniques have comprised applying uncured fiber reinforced plastic materials to the inner surfaces of mold sections, and then assembling the mold sections with the uncured fiber reinforced materials therein around inflatable bladders which are used to apply outward forces to the fiber reinforced plastic materials during curing. However, it has been found that because the cumulative outward forces applied to female molds by inflatable bladders are extremely high, even when the bladders are inflated with relatively low pressure air or gas, it is generally necessary to utilize extremely strong, highly reinforced molds to effectively apply such techniques. Hence, heretofore it has generally not been practical to form fiber reinforced plastic structures in female molds utilizing inflatable bladders when constructing multi-layered laminate structures, such as honeycomb-cored structures, which require significant levels of outward pressure (generally at least 13 psi) to maintain the laminations in proper orientation, and in pressurized contact prior to and during curing. For these reasons, the processes which have been heretofore available for manufacturing fiber reinforced plastic structures that require high pressure during curing and finished outer surfaces have generally been unsatisfactory for production operations.

The instant invention provides an effective method of forming hollow structures, as well as an effective method of forming interior joints in at least partially enclosed confined interior areas of structures. Specifically, the method of the instant invention as it is applied to forming a hollow structure of a predetermined configuration, comprises the steps of assembling a composite layer assembly and a vacuum bag in a female mold having an inner configuration which is complimentary to the desired predetermined outer configuration of the hollow structure. The composite layer assembly comprises, at least in part, an uncured fiber reinforced plastic material, and it is assembled in the mold so that it substantially covers the inner surface of the mold. The vacuum bag is assembled so that it is received in the interior area defined by the composite layer assembly, so that the vacuum bag and the composite layer assembly cooperate to define an evacuation layer or area therebetween. In the preferred method, a release layer and a vacuum "breather" layer are assembled in the mold between the composite layer assembly and the vacuum bag, so that the release layer is adhered to the composite layer by the inherent tackiness of the uncured composite layer assembly, and so that the breather layer can communicate vacuum to substantially the entire outer surface of the vacuum bag. The vacuum bag is then adhesively secured to the release layer at various locations in order to effectively retain the vacuum bag in position along substantially the entire inner surface of the composite layer assembly. In this regard, when adhesively securing the vacuum bag to the release layer particular attention is preferably given to securing it to the release layer so that the vacuum bag extends into any inside corners, cavities, or other areas of irregular configuration, to enable the vacuum bag to be effectively utilized for applying outward pressure to the composite layer assembly in these areas. In any event, once the composite layer assembly, the vacuum bag, the breather layer and the release layer have been installed in the interior of the female mold and the mold has been fully assembled in a closed position, the method is further carried out by venting the interior of the vacuum bag to the atmosphere, and evacuating the evacuation area between the vacuum bag and the composite layer assembly so that the air in the interior of the vacuum bag operates to apply outward pressure of normally between approximately 13 and 14 psi to the inner surface of the composite layer assembly. Thereafter, the method is further carried out by curing the composite layer assembly to form a cured composite layer assembly, releasing the vacuum on the evacuation area, and removing the cured composite layer assembly from the mold.

The composite layer assembly preferably comprises fiber reinforced plastic inner and outer layers and a core layer therebetween for maintaining the inner and outer fiber reinforced plastic layers in spaced relation. Further, the composite layer assembly is preferably formed in at least two composite layer assembly sections which correspond to sections of the female mold. The at least two composite layer assembly sections are assembled in the mold sections thereof, and a fiber reinforced plastic overlap layer is assembled therewith so that it overlaps mating composite layer assembly sections when they are received in assembled relation to create a structure with continuous fiber reinforcement rather than glued seams. Still further, an uncured foaming epoxy core splice material is preferably assembled in the corner areas between adjacent composite layer assembly sections to fill any voids in the corner areas of the composite layer assembly.

The method of forming a hollow structure of the subject invention preferably further includes a step of removing the vacuum bag, the breather layer, and the release layer from the cured composite layer assembly after removing the cured composite layer assembly from the mold. This step is preferably carried out by forming an access hole in the cured composite layer assembly, drawing adjacent portions of the vacuum bag, the breather layer, and the release layer outwardly through the access opening and twisting the adjacent sections of the vacuum bag, the breather layer, and the release layer relative to the cured composite layer assembly in order to separate the vacuum bag, the breather layer, and the release layer therefrom. Thereafter, the vacuum bag, the breather layer, and the release layer are pulled outwardly through the access hole.

The method of the subject invention can also be utilized for forming a hollow member having an inner support wall, or like structure therein. In this case, an inner support wall or the like comprising a pair of spaced fiber reinforced plastic layers and an inner core layer therebetween is assembled in the interior of a composite layer assembly so that the support wall extends between spaced portions of the composite layer assembly. Uncured reinforcing fiber reinforced plastic layers are assembled in the joint areas, and uncured foaming epoxy or core splice strips are preferably also assembled in the joint areas. The vacuum bag is adhesively secured in position in the joint areas between the support wall and the composite layer assembly, so that the vacuum bag is operative for effectively applying outward pressure to the laminations in the joint areas between the support wall and the composite layer assembly in order to retain these laminations and the support wall in position during the curing process.

The subject invention can also be effectively utilized for forming a reinforced interior joint at an intersection between adjacent elements in an at least partially enclosed area in a hollow member that would otherwise be inaccessible and require gluing. In this case, the method is carried out by assembling an uncured fiber reinforced plastic material in the particular joint area so that it extends between the adjacent elements at the intersection, and then assembling a vacuum bag, and preferably also a release layer and a breather layer, in the at least partially enclosed area so that the vacuum bag extends along the uncured fiber reinforced plastic materials and cooperates therewith to define an evacuation area. The evacuation area is then evacuated so that the vacuum bag, and preferably also the release layer and the breather layer, are drawn toward the fiber reinforced plastic materials at the intersection to retain the fiber reinforced plastic materials in position during the curing operation.

It has been found that the method of the instant invention can be effectively utilized for forming hollow structures. Specifically, it has been found that by assembling a vacuum bag in the interior of an uncured composite layer assembly of a hollow structure in a female mold and evacuating the area between the vacuum bag and the composite layer assembly, the composite layer assembly can be effectively held in position during a curing operation in order to eliminate voids in the cured composite layer assembly. It has been further found that by adhesively securing a vacuum bag in position adjacent any inner corners or the like in a composite layer assembly, the vacuum bag can be more effectively held in position for applying outward pressure to the composite layer assembly during a curing process. It has been even still further found that by assembling an uncured foaming epoxy material in the joint areas between sections of a composite layer assembly and applying overlapping fiber reinforced plastic layers to these joint areas, the final finished composite layer assembly formed by the method of the subject invention can be made so that it is essentially seamless in appearance and is substantially free from voids.

Accordingly, it is a primary object of the invention to provide a method which combines the advantages of male and female molds in the construction of seamless fiber reinforced plastic hollow structures.

Another object of the instant invention is to provide a process for forming fiber reinforced joints at confined, enclosed, or otherwise inaccessible intersections between composite parts.

Another object of the instant invention is to provide an effective method of forming a hollow structure from a composite layer assembly comprising an uncured fiber reinforced plastic material.

Still another object of the instant invention is to provide an effective method of forming a hollow structure by assembling an uncured composite layer assembly and a vacuum bag in a female mold, venting the interior of the vacuum bag to atmosphere and evacuating the area between the vacuum bag and the composite layer assembly in order to apply outward pressure thereto.

An even still further object of the instant invention is to provide a method of forming an interior seam at an intersection between adjacent elements in an at least partially enclosed area in a hollow structure.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DESCRIPTION OF THE INVENTION

Figure 1:
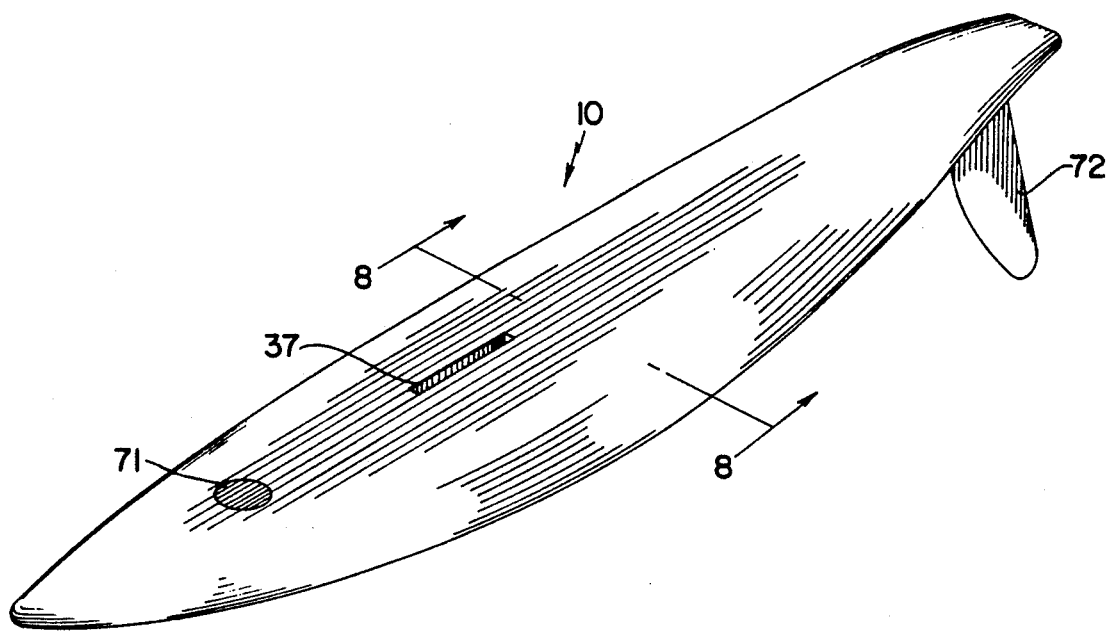
FIG. 1 is a perspective view of a hollow sailboard hull made by the method of the instant invention.

Referring now to the drawings, the method of the instant invention is illustrated in FIGS. 2 through 10. The method is operable for forming a seamless hollow structure, such as a sailboard hull of the type illustrated in FIG. 1 and generally indicated at 10. The method is carried out by assembling an uncured composite layer assembly generally indicated at 12 (see FIG. 9) and a vacuum bag 14 in a female mold 16 comprising bottom and deck mold sections 18 and 20, respectively. The method is then further carried out by venting the interior of the vacuum bag 14 to the atmosphere, evacuating the area between the vacuum bag 14 and the composite layer assembly 12, curing the composite layer assembly 12 to form a cured composite layer assembly 22, removing the cured composite layer assembly 22 from the mold 16, and removing the vacuum bag 14 from the cured composite layer assembly 22.

The mold 16 is preferably constructed in a conventional manner from a rigid material, such as a fiber reinforced plastic material or aluminum in a suitable durable and rugged construction. The deck section 20 includes a pair of mating halves 24 and 26 which are joined along flanges 28 and 30 with a plurality of bolts 32. A plurality of vacuum tubes 34 extend into the interior of the deck section 20, and a vent tube 36 also extends into the interior of the deck section 20. The deck section 20 is configured to form a recess 37 in the cured composite layer assembly 22 for receiving a mast, and the bottom section 18 is configured to provide a recess for securing a fin to the rear portion of the cured composite layer assembly 22. The deck section 20 also includes peripheral flanges 38 and 40, and the bottom section 18 is securable to the deck section 20 along the flanges 38 and 40 with bolts 41 or other fastening means. When the deck section 20 and the bottom section 18 are secured together in this manner they cooperate to define a substantially enclosed interior cavity having a configuration which is complementary to that of the sailboard hull 10.

Figure 2:
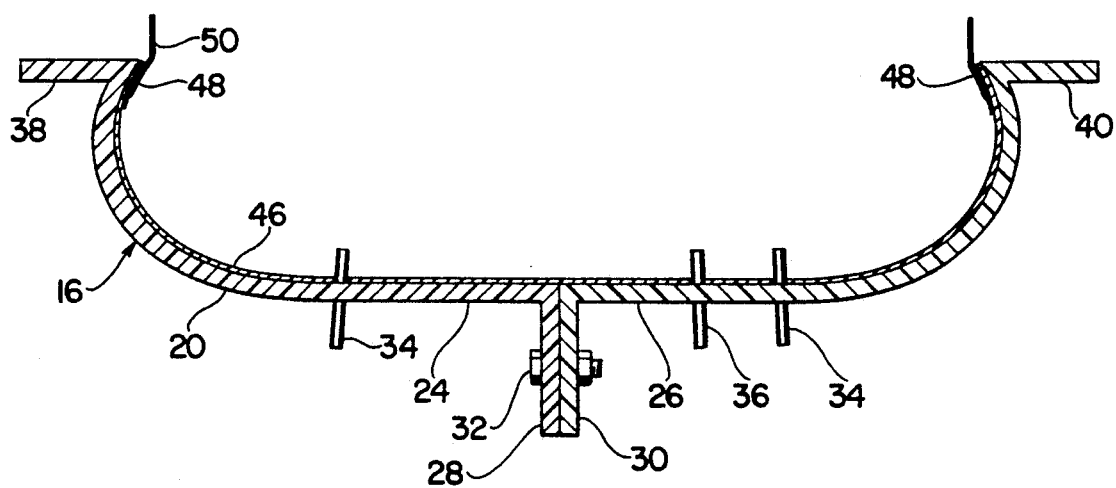
FIGS. 2 through 9 are sequential transverse sectional views illustrating the method of forming the hull illustrated in FIG. 1.
Figure 3:
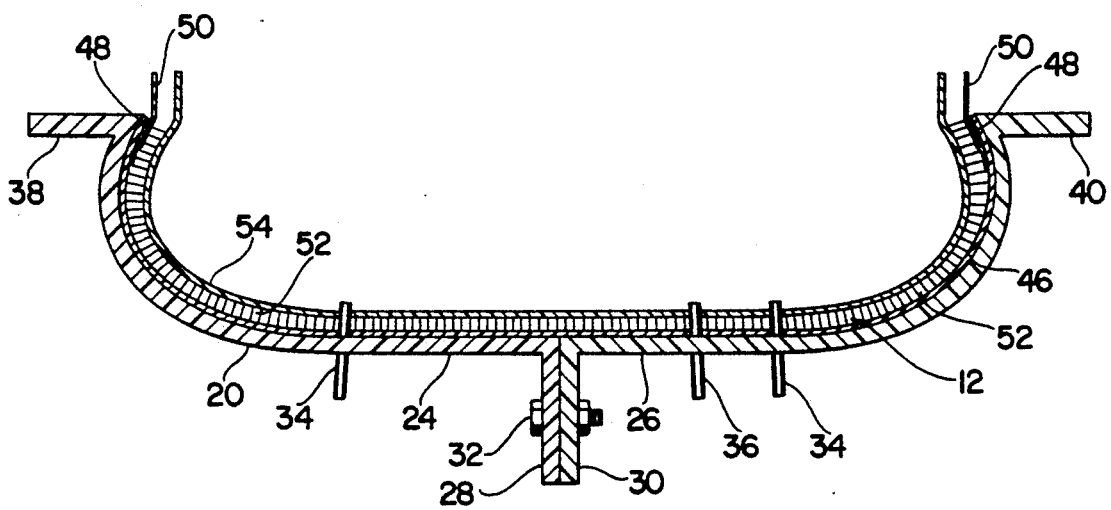
Figure 4:
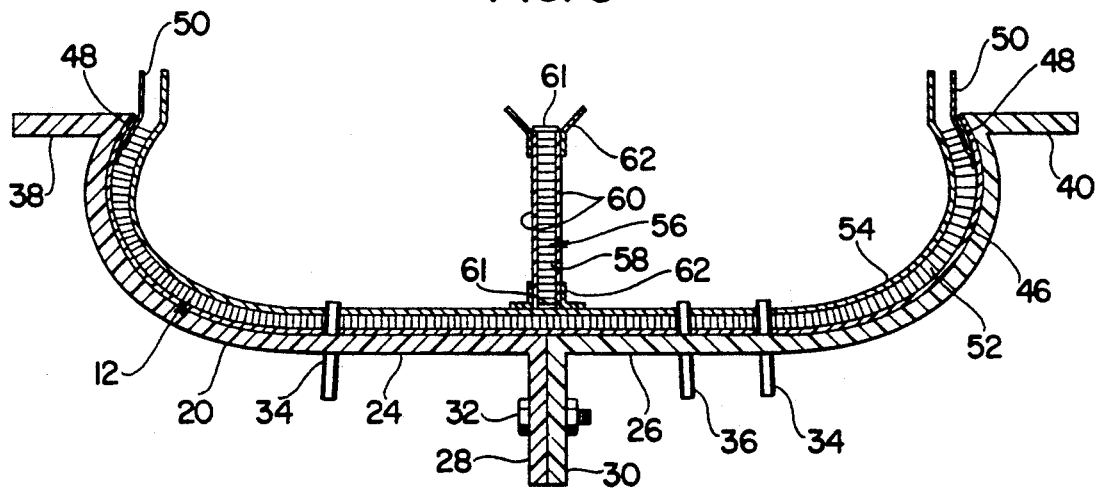
Figure 5:
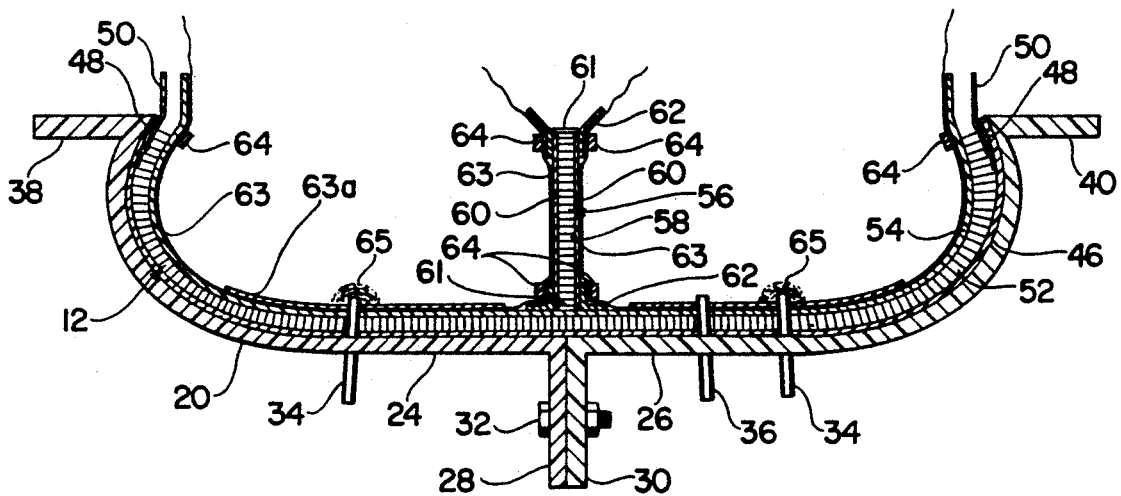
Figure 6:
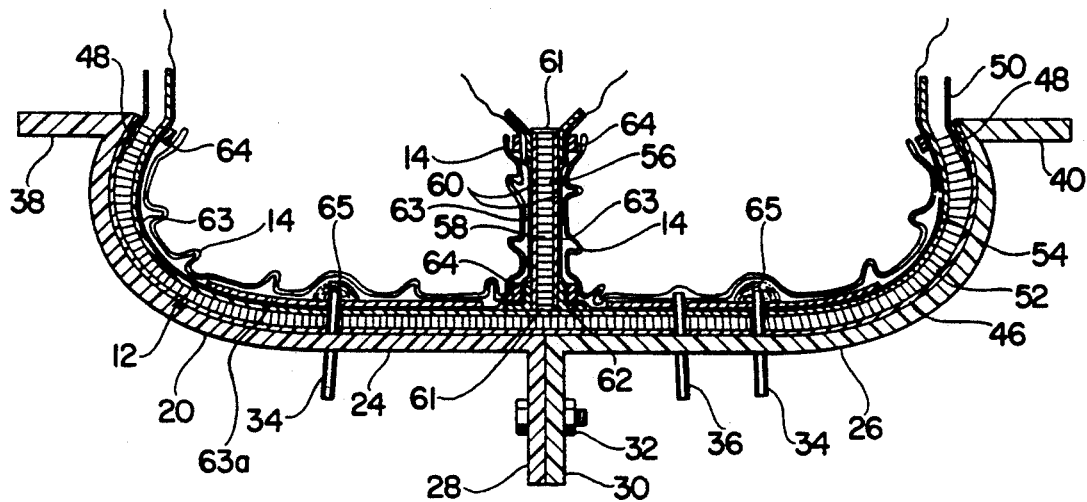
Figure 7:
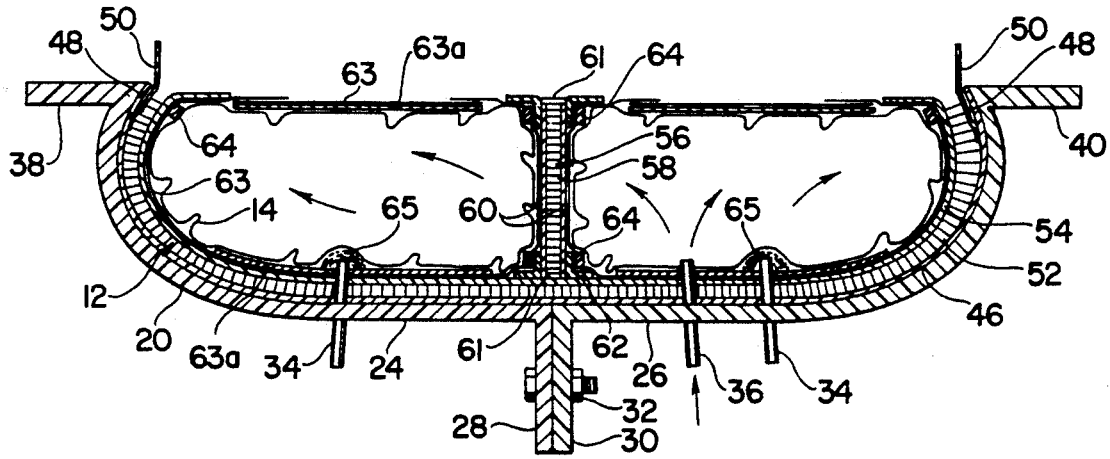

In the first step of the method, deck and bottom portions 42 and 44, respectively, of the composite layer assembly 12 are assembled in the mold 16 along with the vacuum bag 14 so that the deck and bottom portions 42 and 44, respectively, of the composite layer assembly 12 extend along the inner surfaces of the deck and bottom sections 18 and 20, respectively, of the mold 16. In this regard, although in some cases the first phase of forming the composite layer comprises applying an outer surface finish material (not shown), such as an epoxy primer or a gelcoat, to the inner surfaces of the mold sections 18 and 20, it has been found that in most instances some outer finish work is still required after the composite layer assembly 12 has been cured. As a result, in many cases the step of initially applying an outer surface finish material can be eliminated in favor of applying an outer finish layer to the cured composite layer assembly 22. Accordingly, as illustrated in FIG. 2, the first step of forming the composite layer assembly section 42 in the method as herein set forth comprises applying an outer layer of fiber reinforced plastic material 46 to the deck mold section 20. The fiber reinforced plastic material layer 46 comprises fiberglass or other suitable reinforcing fibers, such as carbon fibers which are pre-impregnated with an uncured resin such as an epoxy. Pre-impregnated materials of this type, which are commonly known as "prepreg" materials, are commercially available and adapted so that they are formable and normally at least slightly tacky at ambient temperatures, and so that they are heat curable to form rigid fiber reinforced plastic layers. The prepreg layer 46 is applied, so that it adheres to the outer gelcoat or primer layer (not shown) or to the inner surface area of the mold section 20, and so that it extends over substantially the entire inner area of the mold section 20. Further, strips of core splice material 48, which preferably comprise an expanding heat curable epoxy foam, are assembled in the mold section 20, so that the core splice material 48 extends along the extremities of the mold section 20 which are adapted to mate with the mold section 18. Overlapping layers 50 of uncured prepreg are also assembled in the deck mold section 20, so that they extend along the inner sides of the core splice strips 48. Further, the layers 50 are adapted so that they extend inwardly a short distance into the mold section 20, and outwardly a distance for mating the outer fiber reinforced plastic layers of the bottom portion 44. Once the outer layer 46, the core splice strips 48, and the layers 50 have been assembled in the deck mold section 20, a core layer 52 and an inner prepreg layer 54 are assembled in the deck mold section 20. As will be seen, the inner layer 54 is preferably adapted so that it extends beyond the core layer 53 along the mating extremities of the mold section 20, so that it can overlap the adjacent portions of the bottom portion 44 on the inner side of the bottom mold section 18. The core layer 52 preferably comprises a layer of conventional core material such as a Ciba-Geigy Nomex Honeycomb core, and it preferably has a thickness of approximately ⅜".

Figure 8:
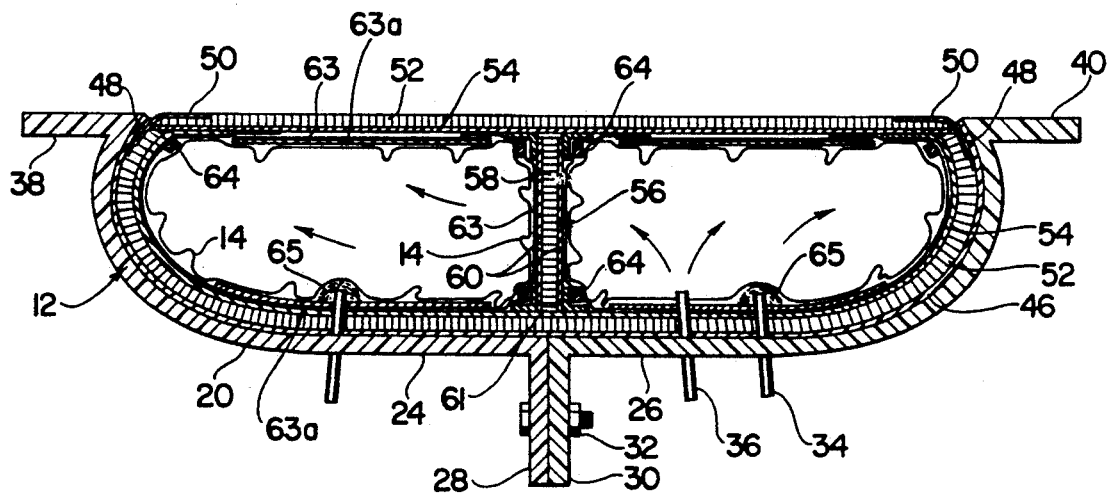
Figure 9:
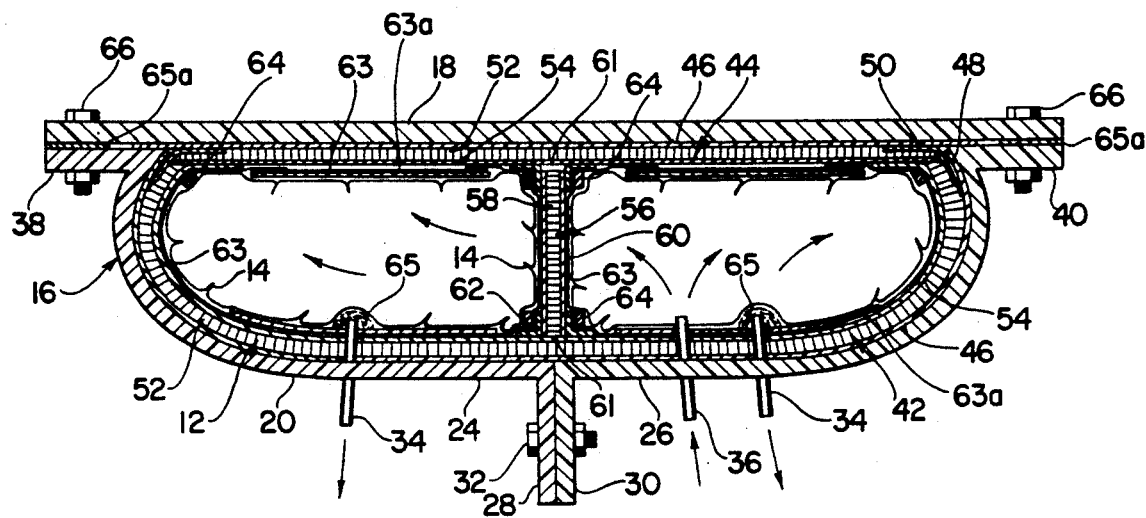
Figure 10:
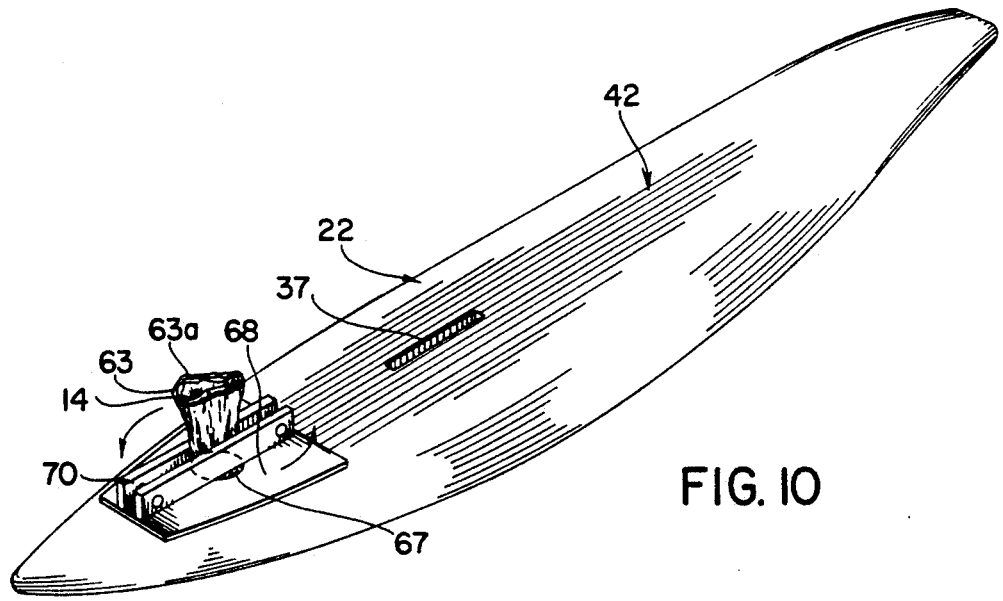
FIG. 10 is a perspective view illustrating the removal of the vacuum bag, the breather layer, and the release layer from the sailboard hull.

As the composite layer assembly 12 is assembled in the deck mold section 20 in the manner hereinabove set forth, an inner support wall generally indicated at 56 is preferably also assembled in the deck mold section 20 in the manner illustrated. Specifically, the inner support wall is assembled so that it extends a distance in a longitudinal direction in the deck mold section 20 in substantially perpendicular relation to the composite layer assembly portion 42 therein terminating in spaced relation to the opposite ends of the composite layer assembly 42. The support wall 56 preferably comprises a pre-cured composite including a center core layer 58 which preferably also comprises a Nomex Honeycomb core, a pair of fiber reinforced plastic outer layers 60, and a plurality of core splice foaming epoxy strips 61, which extend along the upper and lower edges of the core layer 58. The support wall 56 further comprises overlapping prepreg layers or strips 62 which overlap the adjacent portions of the inner layer 54 in the deck mold section 20, and which are adapted to overlap the adjacent portions of a corresponding layer in the bottom mold section 18 when the mold sections 18 and 20 are assembled. Thereafter a release film layer 63 is assembled in the mold section 20 so that it is adhered to the prepreg layer 54 by the natural tackiness of the uncured prepreg layer 54, and so that the release film layer 63 covers substantially all of the inner surfaces of the prepreg layer 54 and the outer layers 60. Thereafter, a layer of treated nylon fabric material commonly known as "peel ply", is assembled in the mold section 20 over the release film layer 63. In this case, the "peel ply" acts as a breather material to assure that vacuum can be communicated from the tubes 34 to virtually the entire area surrounding the vacuum bag 14 once the latter has been assembled in the mold 16. In the next phase of the first step of the method, two-sided vacuum bag sealant tape strips 64 are applied to the release film layer 63 in the deck mold section 20 adjacent the extremities of the composite layer assembly section 42, which are adapted to mate with corresponding portions of the composite layer assembly section 44 in the bottom mold section 18. Strips of bag sealant tape 64 are also applied to the release layer 63 at the inside corner areas in the deck mold section 20 where the support wall 56 meets the composite layer assembly section 42, and where the opposite extremity of the support wall 56 is adapted to meet corresponding portions of the composite layer assembly section 44 in the bottom mold section 18. The bag sealant tape 64 is preferably of conventional construction and it is operative for adhesively securing the vacuum bag 14 in position in the interior of the mold 16. Further, it will be understood that in other applications of the method the sealant tape 64 can be effectively utilized for securing vacuum bags 14 in place in other at least partially enclosed areas which are inaccessible once the corresponding structural elements thereof have been assembled. Porous layers 65 of a relatively loose fabric, such as burlap or the like, are assembled over the inner ends of the vacuum tubes 34 to keep the tubes 34 open so that vacuum can be more effectively applied to all of the outer surfaces of the vacuum bag 14. In the next portion of the first step of the method, the vacuum bag 14 is assembled in the deck portion 20 of the mold 16 so that it extends along substantially all of the inner surfaces of the release layer 63 therein. The vacuum bag 14 is secured in position with the vacuum bag sealant tape strips 64, and it preferably extends along one side of the support wall 56, around an end of the wall 56, and then back along the other side thereof so that a single vacuum bag 14 can be utilized for the entire interior of the mold 16. The vacuum bag 14 is assembled so that the vent tube 36 extends through the bag 14, and it is preferably sealed to the outer surfaces of the tubes 36 with sealant tape. Further, the vacuum bag 14 is initially inflated with low pressure air through the tube 34 in order to expand the bag 14 to the configuration illustrated in FIGS. 7 through 9. Thereafter, a bottom section "peel ply" breather layer 63a is overlayed on the vacuum bag 14, a bottom section release layer 63 is overlayed on the bottom section breather layer 63a and the adjacent sections of the vacuum bag 14, and an inner bottom prepreg layer 54 and a core layer 52 are assembled over the bottom section release layer 63. Next, the overlapping prepreg layers 50 are folded over onto the bottom inner core layer 52, as illustrated in FIG. 8. Thereafter, as illustrated in FIG. 9, an outer bottom prepreg layer 46 and the bottom mold section 18 are assembled on the deck mold section 20 and the bottom core layer 52 so that the overlapping seam layer 50 is received along the inner side of the outer layer 46 in the bottom mold section 18, and so that the end portions of the inner layer 54 in the deck mold section 20 overlap the adjacent sections of the inner layer 54 in the bottom mold section 18, as illustrated. A sealant layer 65a which preferably comprises bag sealant tape is assembled between the flanges 38 and 40, and the mating portions of the bottom mold section 18, and the mold sections 18 and 20 are then secured together with bolts 66. When the vacuum bag 14 is assembled in the mold 16 in this manner the tube 36 communicates with the interior of the vacuum bag 14, whereas the tubes 34 communicate with the evacuation area between the exterior of the vacuum bag 14 and the inner prepreg layer 54.

In the next step of the method, the evacuation area between the composite layer assembly 12 and the vacuum bag 14 is evacuated so that the atmospheric pressure in the interior of the vacuum bag applies outward pressure to the interior surfaces of the composite layer assembly 12, in order to maintain the composite layer assembly 12 in properly assembled relation during curing of the uncured resins therein, and in order to apply sufficient pressure to the laminations in the composite layer assembly 12 to assure proper adhesion therebetween. In this regard, because the vacuum bag 14 is adhesively secured to the release layer 63 with the bag sealant tape strips 64 in the critical corner areas where voids would be most likely to occur in the finished composite layer assembly, the vacuum bag 14 is effectively operative for applying outward pressure to these critical areas. Still further, because the core splice strips 48 and 61 apply further pressure and fill in any voids in the inside corner areas of the composite layer assembly 12 and the support wall assembly 56, the structural integrity of the cured composite layer assembly 22 is even further enhanced. Even still further, because the pressure inside the vacuum bag is equal to the atmospheric pressure on the exterior of the mold 16, the mold 16 is not subjected to excessive pressures as would be the case if pressurized air or gas were applied to the interior of the bag 14. Further, even though the pressure inside the vacuum bag 14 is equal to the atmospheric pressure on the exterior of the mold, the outward pressure on the inner prepreg layer 54 can actually be maintained at between 13 and 14 psi during the critical curing stage due to the vacuum surrounding the vacuum bag 14.

Once the composite layer assembly 12, the vacuum bag 14, the release film layer 63 and the breather layer 63a, and the mold 16 have been fully assembled in the manner hereinabove described, and the evacuation area between the vacuum bag 14 and the composite layer assembly 12 has been evacuated, the entire assembly comprising the mold 16, the uncured composite layer assembly 12, the support wall 56, the release layer 63, the breather layer 63a, and the vacuum bag 14 is introduced into an oven or an autoclave where the assembly is exposed to a suitable curing temperature of normally approximately 250° for approximately one hour while vacuum is maintained in the evacuation area around the outer surface of the vacuum bag 14. In this regard, however, it will be understood that the specific curing temperature required in this step depends on the specific resin used and that with some resins curing can be effected at room temperature. In any event, once the resin in the composite layer assembly 12 has been cured, assuming that curing has been effected in an oven or an autoclave, the mold 16 with the cured components therein is removed from the oven or an autoclave and allowed to cool. After the resin has been cured, the vacuum on the evacuation area is released and the mold sections 18 and 20 and the halves 24 and 26 are separated to remove the cured composite layer assembly 22 with the cured support wall 56 therein from the mold 16.

While in some applications it may be acceptable to leave the vacuum bag 14 in the interior of the finished composite layer assembly 22, it has been found that in order to reduce the overall weight of a finished hollow structure it is preferable to remove the vacuum bag 14 from the interior thereof. The preferred method for removing the vacuum bag 14 includes the steps of cutting a hole 67 in the cured composite layer assembly 22, assembling a protective plate or collar 68 on the composite layer assembly 22 adjacent the hole 67, and pulling adjacent portions of the vacuum bag 14, the breather layer 63a, and the release film layer 63 outwardly through the hole 67. Thereafter, a clamp 70 comprising a pair of spaced elongated boards or the like which are secured together with bolts or the like, is assembled on the bag 14, the breather layer 63a and the release film layer 63. The bag 14, the release film layer 63 and the breather layer 63a, are then twisted with the clamp 70 while they are pulled outwardly through the hole 67 by the outward force which is created by the clamp 70 bearing against the plate 68 as the bag 14, the breather layer 63a and the release layer 63 become twisted. In this regard, by twisting the bag 14, the release layer 63 and the breather layer 63a these pieces can be more effectively separated from the inner "prepreg" layer 54 in the composite layer assembly 22 so that the vacuum bag 14, the breather layer 63a and the release layer 63 can be more easily pulled outwardly through the hole 67. Once the vacuum bag 14 and the release layer 63 have been removed from the interior of the composite layer assembly 22 in this manner, the hole 67 is either re-sealed, or a removable access cap or deck plate 71 is installed therein in order to seal the interior of the composite layer assembly 22. Further, a fin 72 is assembled in the appropriate recess in the bottom portion 44 of the composite layer assembly 22. The outer surfaces of the composite layer assembly 22 are finished by conventional means and any desired logos or emblems are applied thereto by conventional techniques.

It is seen therefore that the instant invention provides an effective method of forming a hollow member by assembling a composite layer assembly comprising a fiber reinforced plastic material in the interior of a female mold. The vacuum bag 14 is effectively operable for applying outward pressure to the composite layer assembly 12 while it is in an uncured state in order to effectively maintain the composite layer assembly 12 in assembled relation, and for applying sufficient outward pressure to the composite layer assembly 12 during curing to assure effective bonding between the various laminations thereof. Further, the bag sealant tape 64, which is applied to the inside corner areas of the composite layer assembly 12 in the interior of the mold 16, effectively retains the bag 14 in position in the mold 16 to be sure that the laminations of the composite layer assembly 12 are effectively bonded together in the highly critical corner areas. The core splice material 48 which is applied to the corner areas further assures that the composite layer assembly 12 is effectively retained in position, and that it is substantially free of voids once cured. It has been found that for these reasons, as well as the other reasons hereinabove set forth, the method of the subject invention can be effectively utilized for forming a strong and rigid hollow structure which is lightweight and essentially seamless. Hence, it is seen that the method of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of forming a hollow structure having a predetermined outer configuration comprising:
    a. assembling a vacuum bag, a composite layer assembly made at least partially from an uncured fiber reinforced plastic material, an interior support wall, and an uncured fiber reinforced plastic overlap layer in a female mold, said female mold having an exterior and having an inner mold surface which defines an inner configuration which is complimentary to said predetermined outer configuration, said mold including at least two mold sections which cooperate to define said inner mold surface, said composite layer assembly substantially covering said inner mold surface and having an inner composite layer assembly surface which defines a confined interior area, said support wall being assembled so that it extends between spaced portions of said composite layer assembly and so that said support wall meets said composite layer assembly at interior joint areas, said uncured fiber reinforced plastic overlap layer being assembled so that it extends between said support wall and said composite layer assembly at said interior joint areas, said vacuum bag being received in said confined interior area and cooperating with said composite layer assembly for defining an evacuation area therebetween, said vacuum bag having an exterior surface and having an interior which is at approximately the same pressure as the exterior of said mold, said vacuum bag being operable for applying outward pressure to said inner composite layer assembly surface by the application of a vacuum to the exterior surface of said vacuum bag;
    b. evacuating said evacuation area so that said vacuum bag operates to apply outward pressure to said inner composite layer assembly surface;
    c. curing said composite layer assembly to form a cured composite layer assembly;
    d. releasing the vacuum in said evacuation area; and
    e. removing said cured composite layer assembly from said mold.

2. In the method of claim 1, said composite layer assembly comprising inner and outer fiber reinforced plastic layers and a core layer between said inner and outer fiber reinforced plastic layers for maintaining said inner and outer fiber reinforced plastic layers in spaced relation.

3. In the method of claim 1, each of said composite layer assembly sections comprising inner and outer fiber reinforced plastic layers and a core layer therebetween for maintaining the inner and outer fiber reinforced plastic layers thereof in spaced relation, said at least one fiber reinforced plastic overlap layer overlapping at least one of the inner and outer layers of at least one of said mating composite layer assembly sections in said mating area.

4. In the method of claim 3, said composite layer assembly comprising an uncured foamable epoxy material in said mold between said inner mold surface and said outer fiber reinforced plastic layer in said mating area in order to fill any voids in said composite layer assembly in said mating area.

5. The method of claim 1, further comprising assembling a release layer and a breather layer in said mold between said composite layer assembly and said vacuum bag during said step of assembling said composite layer assembly and said vacuum bag in said mold, said breather layer being assembled between said release layer and said vacuum bag, said method further comprising the step of removing said vacuum bag, said breather layer, and said release layer from said cured composite layer assembly after said step of removing said cured composite layer assembly from said mold.

6. In the method of claim 5, said step of removing said vacuum bag said breather layer and said release layer comprising:
   a. forming an access hole in said cured composite layer assembly, said access hole being of sufficient size to permit the removal of said vacuum bag therethrough;
   b. pulling adjacent sections of said vacuum bag said breather layer and said release layer outwardly through said access hole; and
   c. twisting said adjacent sections of said vacuum bag, said breather layer and said release layer to separate said release layer from said composite layer assembly and pulling said vacuum bag said breather layer and said release layer outwardly through said access hole.

7. In the method of claim 1, said predetermined outer configuration including at least one outside corner area, said method further comprising adhesively securing said vacuum bag in position in said outside corner area during said step of assembling said composite layer assembly and said vacuum bag in said mold.

8. In the method of claim 5, said predetermined outer configuration including at least one outside corner area, said method further comprising adhesively securing said vacuum bag to said release layer adjacent said outside corner area.

9. In the method of claim 1, said support wall comprising a pair of spaced fiber reinforced plastic outer layers and an inner core layer therebetween, said evacuation area extending both between said vacuum bag and said fiber reinforced outer layers of said support wall and between said vacuum bag and said overlap layer, said vacuum bag being expandable to a disposition wherein it is operable for applying outward pressure to said spaced fiber reinforced plastic outer layers of said support wall and said overlap layer along substantially the entire extents thereof.

10. In the method of claim 9, said support wall meeting said composite layer assembly in an angular relation at an intersection, said method further comprising adhesively securing said vacuum bag in position at said intersection before said evacuating step.

11. In the method of claim 9, said support wall meeting said composite layer assembly in an angular relation at an intersection, said method further comprising assembling a release layer between said composite layer assembly and said vacuum bag and adhesively securing said vacuum bag to said release layer adjacent said intersection before said evacuating step.

12. In the method of claim 1, said composite layer assembly comprising at least two composite layer assembly sections which correspond to said at least two mold sections and which are receivable in assembled relation, so that said at least two composite layer assembly sections are received in mating relation along mating areas, and so that they cooperate to substantially cover said inner mold surface, and at least one uncured fiber reinforced plastic overlap layer which overlaps mating composite layer assembly sections in each of said mating areas.

13. A method of forming an interior joint at an intersection between adjacent elements in an enclosed area during the construction of a hollow structure, said adjacent elements including an outer wall portion and an interior support wall, said method comprising:
   a. assembling said elements with an uncured fiber reinforced plastic material and a vacuum bag, so that said outer wall portion and said interior support wall cooperate to define said joint and to least partially define said enclosed area with said uncured fiber reinforced plastic material extending between said outer wall portion and said interior support wall at said joint, so that said vacuum bag and said fiber reinforced plastic material are received in said enclosed area, and so that said vacuum bag extends along said uncured fiber reinforced plastic material so as to define an evacuation area between said uncured fiber reinforced plastic material and an adjacent portion of said vacuum bag, said evacuation area being evacuatable to draw said adjacent portion of said vacuum bag toward said fiber reinforced plastic material at said joint;
   b. evacuating said evacuation area so that said adjacent portion of said vacuum bag operates to apply outward pressure to said fiber reinforced bag operates to apply outward pressure to said fiber reinforced plastic material at said joint; and
   c. curing said uncured fiber reinforced plastic material.

14. The method of claim 13, further comprising assembling a release layer and a breather layer in said enclosed area before assembling said vacuum bag therein, said release layer extending over substantially the entire extent of said fiber reinforced plastic material adjacent said joint, said breather layer being assembled between said vacuum bag and said release layer.

15. The method of claim 14, said vacuum bag being adhesively secured to said release layer adjacent said joint during said assembling step so that said vacuum bag is operable for urging said fiber reinforced plastic material toward said adjacent elements at said joint.

16. The method of claim 13, further comprising adhesively securing said vacuum bag in position adjacent said joint during said assembling step, so that said vacuum bag is operable for urging said fiber reinforced plastic material toward said adjacent elements at said joint.

17. A method of forming an interior joint at an intersection between adjacent elements in an at least partially enclosed area during the construction of a hollow structure, said adjacent elements including an outer wall portion and an interior support wall, said method comprising:

a. assembling said elements with an uncured fiber reinforced plastic material and a vacuum bag, so that said outer wall portion and said interior support wall cooperate to define said joint and to least partially define said at least partially enclosed area with said uncured fiber reinforced plastic material extending between said outer wall portion and said interior support wall at said joint, so that said vacuum bag and said fiber reinforced plastic material are received in said at least partially enclosed area, and so that said vacuum bag extends along said uncured fiber reinforced plastic material so as to define an evacuation area between said uncured fiber reinforced plastic material and an adjacent portion of said vacuum bag, said interior joint being inaccessible for assembling and positioning said vacuum bag in said at lest partially enclosed area once said elements have been assembled with said uncured fiber reinforced plastic material and said vacuum bag, said evacuation area being evacuatable to draw said adjacent portion of said vacuum bag toward said fiber reinforced plastic material at said joint;

b. evacuating said evacuation area so that said adjacent portion of said vacuum bag operates to apply outward pressure to said fiber reinforced plastic material at said joint; and c. curing said uncured fiber reinforced plastic material.

18. In the method of claim 17, said support wall comprising a pair of spaced fiber reinforced plastic outer layers and an inner core layer therebetween, said evacuation area extending both between said vacuum bag and said fiber reinforced outer layers of said support wall and between said vacuum bag and said overlap layer, said vacuum bag being expandable to a disposition wherein it is operable for applying outward pressure to said space fiber reinforced plastic outer layers of said support wall and said overlap layer along substantially the entire extents thereof.

19. In the method of claim 17, said support wall meeting said composite layer assembly in an angular relation at an intersection, said method further comprising adhesively securing said vacuum bag in position at said intersection before said evacuating step.

20. In the method of claim 17, said support wall meeting said composite layer assembly in an angular relation at an intersection, said method further comprising assembling a release layer between said composite layer assembly and said vacuum bag and adhesively securing said vacuum bag to said release layer adjacent said intersection before said evacuating step.

21. The method of claim 17, further comprising adhesively securing said vacuum bag in position adjacent said joint during said assembling step, so that said vacuum bag is operable for urging said fiber reinforced plastic material toward said adjacent elements at said joint.

* * * * *

UNITED STATES PATENT AND TRADEMARK OFFICE
CERTIFICATE OF CORRECTION

PATENT NO.  : 5,266,249
DATED       : November 30, 1993
INVENTOR(S) : GRIMES, Paul J., and DUFFY, Timothy M.

It is certified that error appears in the above-identified patent and that said Letters Patent is hereby corrected as shown below:

Column 6, lines 46 and 60 (both occurrences), after "Nomex" insert:
--(registered trademark of E.I. de Pont de Nemours and Company)--.

Signed and Sealed this

Twenty-third Day of August, 1994

Attest:

BRUCE LEHMAN

Attesting Officer            Commissioner of Patents and Trademarks